United States Patent [19]

Moss

[11] Patent Number: 4,508,544
[45] Date of Patent: Apr. 2, 1985

[54] CONVERTING A FUEL TO COMBUSTIBLE GAS
[75] Inventor: Gerald Moss, Wantage, England
[73] Assignee: Exxon Research & Engineering Co., Florham Park, N.J.
[21] Appl. No.: 560,241
[22] Filed: Dec. 12, 1983

Related U.S. Application Data
[62] Division of Ser. No. 360,411, Mar. 22, 1982, Pat. No. 4,459,133.

[30] Foreign Application Priority Data
Mar. 24, 1981 [GB] United Kingdom ............... 8109230
Mar. 24, 1981 [GB] United Kingdom ............... 8109231

[51] Int. Cl.$^3$ ............................ C10J 3/00; C10J 3/54
[52] U.S. Cl. ............................ 48/197 R; 48/202; 48/210; 48/213; 252/373; 423/244; 423/542
[58] Field of Search ............... 48/197 R, 202, 201, 48/213, 210, 203; 423/244 A, 542; 252/373

[56] References Cited
U.S. PATENT DOCUMENTS
2,527,197 10/1950 Rollman ..................... 48/206
3,729,551 4/1973 Gorin ........................ 423/542
3,807,090 4/1974 Moss ......................... 48/211
3,870,480 3/1975 Moss ......................... 48/71
4,414,001 11/1983 Kunii ........................ 48/197 R Primary Examiner—Peter Kratz
Assistant Examiner—Joye L. Woodard
Attorney, Agent, or Firm—Edward H. Mazer

[57] ABSTRACT

A sulfur-containing fuel is passed into a first fluidized bed (13) containing $CaSO_4$ and $CaO$ and an oxygen-transfer mediator (e.g. $H_2$) whereby the fuel is converted to combustible gas (18), some $CaSO_4$ being reduced to $CaS$ and sulfur being fixed as $CaS$ by reaction with $CaO$. Bed particles pass from the bottom layer of the first bed (13) into the bottom layer of the second bed (14) which is fluidized by air at conditions such that some, but not all of the $CaS$ is selectively oxidized to $CaSO_4$ with no liberation of sulfur moieties. Bed particles pass from the bottom layer of the second bed (14) to the bottom layer of a third bed (15) optionally after passage via a fourth bed (60, FIG. 2) between the second and third beds. In the third bed (15), particles are fluidized with air to convert $CaS$ selectively to $CaSO_4$ with no liberation of sulfur moiety whereby to raise the particles' temperature sufficiently above that of the first bed that particles passing from the bottom layer of the third bed into the bottom layer of the first bed provide sufficient sensible heat to maintain the fuel conversion temperature of the first bed (13). In the fourth bed (60, FIG. 2), particles are fluidized with air under such conditions that sulfur moiety is liberated, preferably at a rate which approximately equals the rate of sulfur-capture in the first bed (13) whereby to maintain approximately a constant amount of reactive $CaO$ in the beds for sulfur-capture in the first bed (13).

8 Claims, 2 Drawing Figures

CONVERTING A FUEL TO COMBUSTIBLE GAS

This is a division of application Ser. No. 360,411, filed Mar. 22, 1982, now U.S. Pat. No. 4,459,133.

BACKGROUND OF THE INVENTION

The present invention relates to converting a fuel to combustible gas.

European patent application No. 80300003.3, publication No. 0013590, describes and claims a method of converting a fuel (which may be a liquid fuel or a solid fuel or a mixture of liquid and solid fuels) to a substantially inerts-free combustible reducing and/or synthesis gas product, the method comprising passing the fuel into a fuel conversion zone comprising a conversion bed of solid particles which are maintained at an elevated fuel conversion temperature and fluidized by a fluidizing gas which is passed into the bottom of the conversion bed and rises upwardly therethrough, the conversion bed comprising particles containing reactive calcium sulfate ($CaSO_4$) which constitutes substantially the sole source of oxygen used in the conversion of the fuel, and the fluidizing gas passed into the bottom of the conversion bed comprising at least one gas phase and/or vapour phase substance which serves to promote and/or mediate the transfer of oxygen to the fuel and/or partially converted derivatives thereof from the $CaSO_4$ (which is thereby reduced to calcium sulfide, CaS), the fluidizing gas being substantially free of (a) molecular oxygen, and (b) unreactive and/or inert materials which would dilute the combustible gas product.

In preferred embodiments, particles from the conversion zone are fluidized by molecular oxygen-containing gas in an oxidation zone separate from the fuel conversion zone so as to oxidize calcium sulfide in said particles to $CaSO_4$, and particles which have been fluidized in the oxidation zone are returned to the fuel conversion bed for use in converting further quantities of fuel, the molecular oxygen-containing gas being in excess to substantially suppress the empirical reaction:

$$2CaS + 3O_2 \rightarrow 2CaO + 2SO_2 \qquad (1)$$

In preferred embodiments, the conversion bed contains particles comprising calcium oxide (CaO) to react with and fix sulfur from the fuel as CaS so that the combustible gas product has a low sulfur content, and particles from the conversion zone are preferably fluidized by a gas containing molecular oxygen in a regeneration zone so as to convert CaS to CaO with the liberation of sulfur as sulfur oxide (principally $SO_2$) and/or elemental sulfur, and particles containing CaO are returned to the conversion bed directly and/or indirectly for use in reacting with and fixing sulfur from further amounts of fuel undergoing conversion.

Many multi-step processes, such as the fuel-conversion process as hereinabove referred to, employ a discrete vessel for each step. A drawback of this almost universal practice is that the flow of particles from one vessel to another is through pipes or conduits which for practical reasons must be so positioned that the flow pattern of particles within each vessel departs appreciably from the ideal.

SUMMARY OF THE INVENTION

It is an object of the present invention to provide for fuel conversion to combustible gas in a multi-step process wherein the flow pattern of particles in each step approaches the ideal flow pattern. It is an object of the present invention to provide for fuel conversion under such conditions that the efficiency of the process steps is improved.

The present invention provides apparatus for converting a fuel to a combustible gas comprising a unitary vessel comprising a peripheral substantially vertical wall and a roof, the interior of the vessel being divided by substantially vertical walls extending downwardly from the roof into at least three compartments in horizontal succession, each compartment having a respective distributor at its base which distributes a respective fluidizing gas from a respective space beneath the distributor into the bottom of a dense phase fluidized bed of solid particles supported on the distributor whereby the fluidized bed has a substantially distinct top surface at a respective selected top level within the respective compartment, the roof over each compartment having an outlet for the exit of gas from the compartment, each wall defining an underflow weir below said top level providing communication between the downstream end of one compartment on one side of the wall and the upstream end of an adjacent compartment on the other side of the wall for the passage of solid particles from a lower region of the bed in said one compartment to a lower region of the bed in said other compartment, means operable to cause particles to pass from the downstream end of one compartment to the upstream end of the adjacent compartment via a respective underflow weir so that particles circulate through all the beds in succession, means passing a fluidizing gas which is substantially free of inert diluents at a regulated rate into the space beneath the distributor of a first compartment of the succession wherein the particles of the bed in the first compartment include particles comprising reactive $CaSO_4$ and the temperature of said first bed is in the range of from 850° to 1150° C., means for passing a fuel into the bed of the first compartment whereby the fuel is converted to a combustible gas and reactive $CaSO_4$ is reduced to reactive CaS with substantially no liberation of sulfur moiety under the influence of an oxygen-transfer mediator present in the bed, the resulting combustible gas leaving the first compartment via a respective combustible gas outlet, means passing a fluidizing gas containing molecular oxygen at a regulated rate into the space beneath the distributor of a second compartment which receives particles from the first compartment whereby the solids in the bed of the second compartment are fluidized under such conditions that some reactive CaS is exothermically oxidized to $CaSO_4$ and a gas of reduced molecular oxygen content and substantially free of sulfur moiety leaves the outlet in the roof of the second compartment, means passing a fluidizing gas containing molecular oxygen at a regulated rate into the space beneath the distributor of a third compartment which receives particles including particles comprising reactive CaS from the exit of an underflow weir at its upstream end and from the downstream end of which particles pass via an underflow weir into the upstream end of the bed in the said first compartment, the reactive CaS in the particles in the third compartment being oxidized to reactive $CaSO_4$ at a bed temperature such that the gas leaving the third compartment via the respective outlet in the roof comprises some molecular oxygen but substantially no sulfur moiety.

The use of a unitary vessel as hereinabove described provides for the circulation of particles from bed to bed in one sense through each bed and around the vessel so that relatively predictable and relatively controllable temperature and concentration gradients occur in each bed. The particles circulation is effected at the bottom region of each bed so that reactions and conversions can take place in a relatively unimpaired manner above the bottom region of each bed. The unitary vessel is easier and cheaper to construct than the multi-vessel apparatus commonly used, and can have major parts precast or cast in situ which presents benefits from the viewpoint of cost and integrity. Moreover, heat losses from the unitary vessel are lower than from a comparable conventional multi-vessel apparatus since the exposed outer surface is considerably reduced.

In one embodiment, the apparatus comprises a heat transfer device which is at least partly immersed in the fluidized bed in the second compartment and through which at least some of the oxygen-containing gas distributed into the bed of the third compartment is passed whereby to extract heat from the bed in the second compartment by heating the oxygen-containing gas passing through said heat transfer device. If the temperature in the second compartment is maintained sufficiently low, some CaS in the second bed will be oxidized but no sulfur moiety will be liberated. This discovery may be utilized to produce a substantially oxygen-free gas from an oxygen-containing gas mixture such as air. Thus, if air is employed to fluidize the second bed, and provided the temperature is maintained sufficiently low, substantially oxygen-free air (which will be approximately 99% nitrogen and about 1% argon) will leave the second compartment at approximately the temperature of the second bed. Such a gas mixture may be used as if it were nitrogen. Many industrial processes require an oxygen-free gas such as nitrogen for inerting purposes. Nitrogen is also required for ammonia production, and nitrogen is finding increasing use in crude oil production as a means of enhancing the recovery of crude oil. By means of the invention, nitrogen may be made available at an elevated temperature as a by-product from the conversion of fuel to a combustible gas. The nitrogen may be employed at the same site or works as the combustible gas, which clearly saves costs compared to the conventional methods of generating combustible gas and/or heat and nitrogen (or other inert gas).

Preferably, the temperature of the bed in the second compartment is maintained in the range of from 740° to 850° C., e.g. from 750° to 840° C., preferably 780° to 820° C. and most preferably, at 800° C. or thereabouts. Thus the "nitrogen" by-product leaving the second compartment will be at these usefully high temperatures.

The temperature of the bed in the third compartment is preferably higher than the temperature in the first compartment and may be higher than the temperature in all the other compartments. Suitably, the third bed temperature is maintained in the range of from 840° to 1060° C., e.g. from 850° to 1050° C., preferably from 900° to 1000° C., and most preferably at 950° C. or thereabouts. The third bed is fluidized by, e.g. air, which may be constituted at least in part by air which is heated in the heat transfer device in the second bed. The air may be diluted with nitrogen from the second bed to maintain an adequate degree of fluidization within the third bed.

Within the second bed, the temperature is maintained below that at which CaS is oxidized to CaO with the liberation of $SO_2$, so that the principal reaction can be represented as:

$$CaS + 2O_2 \rightarrow CaSO_4 \qquad (2)$$

Reaction (2) is strongly exothermic and provides at least some of the heat for the maintenance of the fuel conversion reactions in the first bed.

Within the third bed, the oxidation of CaS to CaO with the liberation of $SO_2$ is inhibited or suppressed by the presence of excess oxygen which passes into the oxygen-depleted gas leaving the third bed. The amount of oxygen in the oxygen-depleted gas is preferably small to avoid the expense of circulating large volumes of gas through the third bed, and up to 5 vol % $O_2$ is found to be suitable to suppress $SO_2$ production in the third bed, and in most cases, the excess oxygen may be within the range 0.5 to 2.0 vol %, and preferably about 1.0 vol %. The hot low-oxygen gas leaving the third compartment may be useful for at least some of the purposes to which nitrogen might be put.

The apparatus of the invention may comprise a fourth compartment defined between the downstream wall of the second compartment and the upstream wall of the third compartment, the fourth compartment comprising a distributor supporting a dense phase fluidized bed of solid particles extending up to a substantially distinct top surface at a selected top level into the bottom of which is distributed a gas containing molecular oxygen, the fourth bed receiving particles including particles containing reactive CaS at its upstream end from the exit of an underflow weir in the downstream wall of the second compartment, the inventory of particles in the fourth bed being maintained approximately constant by the passage of particles out of the fourth bed, at approximately the same rate as the rate of receipt of particles from the second bed, via an underflow weir defined in a downstream wall of the fourth compartment, which downstream wall forms the upstream wall of the third compartment, the oxygen-containing gas being distributed into the bottom of the fourth bed at such a rate that some of the reactive CaS received in the fourth bed from the second bed is converted to reactive CaO with the liberation of sulfur moiety.

Preferably the particles in the first bed comprise calcium oxide (CaO) which may be derived from limestone or dolomite. Sulfur from sulfur-containing fuel is fixed as CaS by reaction with CaO in the first bed resulting in a low-sulfur combustible gas product.

The conditions in the fourth compartment are preferably so arranged and regulated that sulfur moiety is liberated from the fourth bed at approximately the same rate as sulfur from the fuel is fixed by reaction with CaO to form CaS in the first bed so that the total sulfur content of the particles circulating in the apparatus is maintained at a substantially constant amount. The conversion of the fuel to combustible gas in the first bed by a process involving the mediated reduction of $CaSO_4$ to CaS in practice has a relatively low demand for chemically-transferable oxygen in the particles compared to the requirement for sensible heat in the particles entering the first bed from the third bed, and the circulating particles require only a low sulfur content to satisfy the conversion requirements of $CaSO_4$—e.g. the average sulfur content of the particles need not be higher than 2 weight % and in many instances, about 1 wt. % will be adequate. Any sulfur which is in excess of the amount required for CaSO4 in the first bed is preferably liberated in the fourth bed so as to regenerate reactive CaO which will maintain the sulfur-capture properties of the first bed and thereby result in a low-sulfur combustible gas, and to recover the sulfur which is captured or fixed in the first bed in a relatively concentrated and useful form in the gas phase materials leaving the fourth bed.

Preferably, the rate of supply of molecular oxygen in the gas distributed into the fourth compartment in relation to the rate at which reactive CaS enters the fourth compartment from the second compartment is regulated to be such that the temperature of the fourth bed is maintained within the range of from 1050° to 1090° C., e.g. from 1060° to 1080° C., and most preferably, about 1070° C. Under these conditions, the reaction of CaS and oxygen can be described empirically by the following equation:

$$2CaS + 3O_2 \rightarrow 2CaO + 2SO_2 \tag{1}$$

The SO2 may be recovered in a high concentration (e.g. up to 14 vol % when the fourth bed is fluidized by air, although 6 to 8 vol % is more commonly and easily obtained), or the SO2 may be reduced in the fourth compartment by the provision of a reducing material in the fourth compartment. Preferably the reducing material is provided as a layer of carbon-containing solid (e.g. coal char or petroleum coke) above and in contact with the top surface of the fourth bed. In most operation of the first bed, the gas product leaving the first compartment will contain elutriated carbon-containing solids (e.g. bed particles having a carbon-film thereon when the fuel is a hydrocarbon oil or tar or char particles when the fuel is a solid fuel such as coal or lignite). Advantageously, the apparatus may comprise means (such as a cyclone separator) for separating entrained solids from combustible gas produced in the first bed, and means for passing at least some of the separated entrained solids into the fourth compartment to provide carbonaceous material to reduce sulfur oxide moieties to elemental sulfur.

In embodiments wherein steps are taken to liberate sulfur in a fourth bed, some sulfur must remain in the particles leaving the fourth bed so as to provide the basis for the hot CaSO4 which provides chemically-bound oxygen to convert the fuel to combustible gas.

The particles entering the fourth bed from the second bed therefore contain some sulfur as CaSO4. The second bed is fluidized by a gas containing molecular oxygen (e.g. air) and the rate of distribution of the oxygen-containing gas into the second bed is regulated to be such that the temperature in the second bed is maintained in the range of from 970° to 1030° C., preferably 985° to 1015° C., and most preferably about 1000° C. An excess of oxygen is passed into the second bed so that the gas leaving the second bed contains a small proportion (e.g. up to 5 vol %, preferably 0.5 to 2 vol %, e.g. about 1 vol %) of oxygen which substantially suppresses the liberation of sulfur whereby some (but not all) of the CaS in the second bed is oxidized to CaSO4.

The particles entering the third bed from the fourth bed will contain unconverted reactive CaS. Preferably, the rate of supply of molecular oxygen in the gas (e.g. air) distributed into the third bed is regulated to be such that most CaS is exothermically converted to CaSO4 and the temperature in the third bed is in the range of from 1050° to 1100° C., preferably 1060° to 1090° C., e.g. 1070° to 1080° C. whereby particles passing to the first bed from the third bed have sufficient CaSO4 and sensible heat to maintain the fuel coversion reactions in the first bed.

BRIEF DESCRIPTION OF THE DRAWINGS

The invention is now further described with reference to embodiments thereof, given by way of non-limitative example, and with reference to the accompanying diagrammatic isometric drawings, in which.

It is to be understood that the drawings show only the principal features of the apparatus, and that well-known ancilliary equipment such as valves, fans, blowers, temperature sensors and controllers and conduits have been omitted in the interests of clarity.

DESCRIPTION OF THE INVENTION

Figure 1:
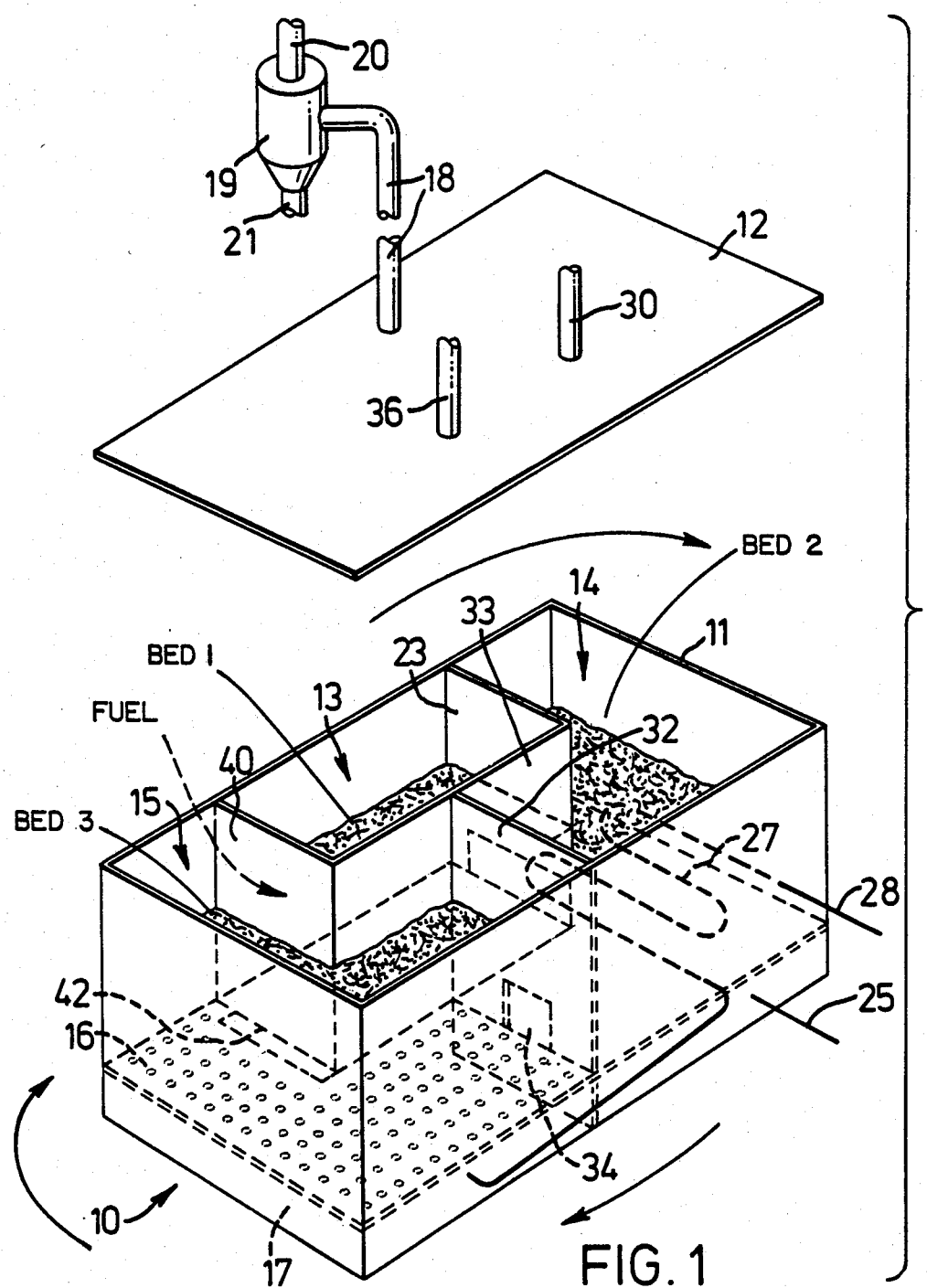
FIG. 1 shows the general arrangement of apparatus according to the invention with the roof separated from the top of the peripheral wall to show the interior layout of the vessel and its three compartments.

Referring first to FIG. 1, the apparatus comprises a unitary vessel 10 in the form of a parallelopiped which has substantially vertical peripheral walls 11 and a roof 12. The interior of the vessel 10 is divided into three compartments by straight substantially vertical walls extending downwardly from the level of the roof. As depicted, a first compartment 13 is rectangular in plan, a second compartment 14 is, in plan, 'J' shaped, and a third compartment 15 is 'L'-shaped in plan. The base of each compartment is defined by a respective gas distributor 16 spaced above the bottom of the vessel so as to distribute gas from the compartmented space, e.g. 17, beneath the distributor into the compartment 15 above the distributor. Each distributor supports a dense-phase fluidized bed of solid particles, which bed is fluidized by the gas distributed into the bottom thereof from the distributor. The fluidized beds each have a relatively distinct top surface, and each compartment 13, 14, 15 communicates with the adjacent compartments by means of underflow weirs in the vertical walls, the top of each underflow weir being below the top surface of the corresponding beds and the bottoms of the underflow weirs being at, or approximately at, the level of the distributor. Gas and vapour leaving the top of each bed can pass out of the respective compartment via an aperture in the roof 12 and a respective conduit. Entrained solids are separated from gases in the conduits by cyclone separators.

Compartment 13 contains a first bed of solid particles comprising calcium sulfate and calcium oxide at a temperature of 950° to 1000° C., e.g. about 975° C. Fuel, e.g. lignite, is passed into the first bed by any convenient solid fuel transport means (not shown). Preferably the fuel is passed in so as to contact a layer of the bed between the top and bottom bed layers, and preferably adjacent to compartment 15. The fuel is converted to combustible gas comprising CO, H2, CH4 by partial oxidation reactions in which the fuel abstracts chemically-bound oxygen from CaSO4, the latter being reduced to CaS. The resulting combustible gas together with entrained bed material (including unconsumed fuel material) leaves the top of the first bed at the first bed temperature and passes out of the compartment 13 via conduit 18. The gas passes into a cyclone 19 which separates solids therefrom, combustible gas of low solids content leaving the cyclone via pipe 20 and separated solids via dipleg 21. Some of the combustible gas is cooled in a cooler (not shown), from which condensibles such as tars and oils are recovered for circulation to the first bed in compartment 13 for exploitation of their fuel values, and the thus cooled and cleaned combustible gas is blown into the space beneath the distributor of compartment 13 so as to pass upwardly via the first bed. The hydrogen in the thus recycled combustible gas mediates the transfer of oxygen from $CaSO_4$ to the fuel while suppressing the liberation of sulfur and sulfur compounds. Preferably, the recycled combustible gas is supplemented by steam which reacts with hot carbon at the bottom of the first bed to produce $H_2$ (and CO) which mediates the oxygen transfer from $CaSO_4$ to the fuel. The combustible gas product is substantially free of inert, non-combustible substances (particularly nitrogen) and is also of a low content of sulfur since sulfur from the fuel is fixed by reaction with the CaO in the bed in the form of CaS.

The end wall 23 of the compartment 13 has an underflow weir in the form of a port or slot (not visible in FIG. 1) extending upwards a short distance from the top level of the distributor, and extending along the wall a sufficient distance to provide for the relatively rapid circulation of particles from a bottom layer only of the first bed into the bottom layer of a second bed in the compartment 14. The bed particles in the second bed comprise CaS, CaO, and the bed is fluidized by air which is passed via conduit 25 into the plenum beneath the distributor supporting the second bed. The rate at which air is passed into the bed is monitored to be less than the requirement for oxidizing the CaS passing through the bed. Such monitoring may be by measuring the temperature rise between the first bed and the second bed and reducing the air rate in conduit 25 as the temperature rise increases. The equipment for effecting such monitoring and regulation is well-known.

A heat exchange coil 27 is immersed in the second bed below the top surface thereof, and air is passed through the coil from inlet pipe 28 at a rate such that the second bed temperature is maintained below the temperature at which CaS is converted to CaO by the empirical reaction scheme of equation (1), whereby substantially all the oxygen of the air entering the bed is fixed or captured by the empirical reaction scheme of equation (2). This reaction is highly exothermic (about 220 kcals/mol) and the air passing through coil 27 extracts significant amounts of heat. If the second bed in compartment 14 is at about atmospheric pressure, the bed temperature should preferably be maintained below 850° C., preferably between 750° and 840° C., e.g. from 780° to 820° C., such as about 800° C. whereby oxygen is removed from the air entering the second bed, according to reaction (2), and the gas leaving the top of the second bed at about the temperature of the second bed is substantially oxygen-free air (e.g. about 99% $N_2$ and 1% A) which may be used for many of the purposes for which nitrogen is employed after any necessary de-dusting and cooling (e.g. by means of a cyclone separator system, electrostatic precipitator, wet scrubbing system, not shown). The hot gas is recovered via conduit 30 extending from the roof 12.

The second bed in compartment 14 is separated from a third bed in compartment 15 by a substantially vertical wall 32 which extends from an internal wall 33 of the vessel 10 to the peripheral wall 11. The wall 32 has an underflow weir 34 defined as a slot therethrough for the passage of particles from the bottom layer of the second bed into the bottom layer of the third bed immediately above the distributor 16.

Particles comprising CaO, $CaSO_4$ and unconverted CaS pass from the second bed via the slot 34 into the third bed which is fluidized by the upward passage therethrough of gas passed into the bottom of the third bed from the plenum 17 beneath the distributor 16. The plenum 17 receives heated air from the heat exchange coil 27, and the amount of heated air (which may be supplemented by cool air and/or nitrogen originating from conduit 30) provided is regulated to be at least sufficient to oxidize substantially all the reactive CaS passing through the third bed to $CaSO_4$ according to equation (2) with the liberation of additional heat which maintains the temperature of the third bed at from 850° to 1050° C., preferably from 900° to 1000° C., more preferably about 950° C. Preferably, the amount of air distributed into the third bed provides oxygen slightly in excess of the requirement for reaction (2) so that the oxygen-depleted air leaving the third compartment 15 via conduit 36 contains a small proportion of unconsumed oxygen, suitably up to 5 vol %, e.g. 0.5 to 2 vol %, preferably about 1 vol %. It has been found that at relatively elevated temperatures, the presence of excess oxygen tends to suppress reaction (1) in favour of reaction (2) so that the gas leaving compartment 15 is substantially sulfur-free.

Compartment 15 is separated from compartment 13 by a substantially vertical wall 40 which extends between the internal wall 33 and the peripheral wall 11. An underflow weir 42 (shown diagrammatically) is defined by a slot in the wall 40 (and optionally, in addition, by a corresponding slot in the distributor 15 where it adjoins the wall 40) to provide a path for the passage of particles from the downstream end of the third bed in compartment 15 to the upstream end of the first bed in compartment 13. The particles which pass from compartment 15 to compartment 13 comprise $CaSO_4$, which serves as a source of oxygen for the conversion of fuel in the first bed, and CaO which will fix sulfur from fuel in the first bed. The sensible heat of the particles at the third bed temperature maintains the first bed at a sufficient high temperature (e.g. 850° to 1150° C., preferably 900° to 1000° C., most preferably about 950° C.) for the fuel conversion reactions to proceed without the addition of heat to the third bed.

Preferably, the vessel 10 is insulated to reduce heat losses. The peripheral and other walls may be of refractory slabs which are either cast in situ or assembled from ex situ castings.

An advantageous feature of the apparatus of the invention is that particles circulate therethrough in a single sense (clockwise in plan as shown in FIG. 1) at the bottom layer of each bed, so that the bottom layer can circulate relatively rapidly to maintain the heat requirements of the first bed while more elevated layers have sufficient residence time for the desired chemical reactions to occur.

Figure 2:
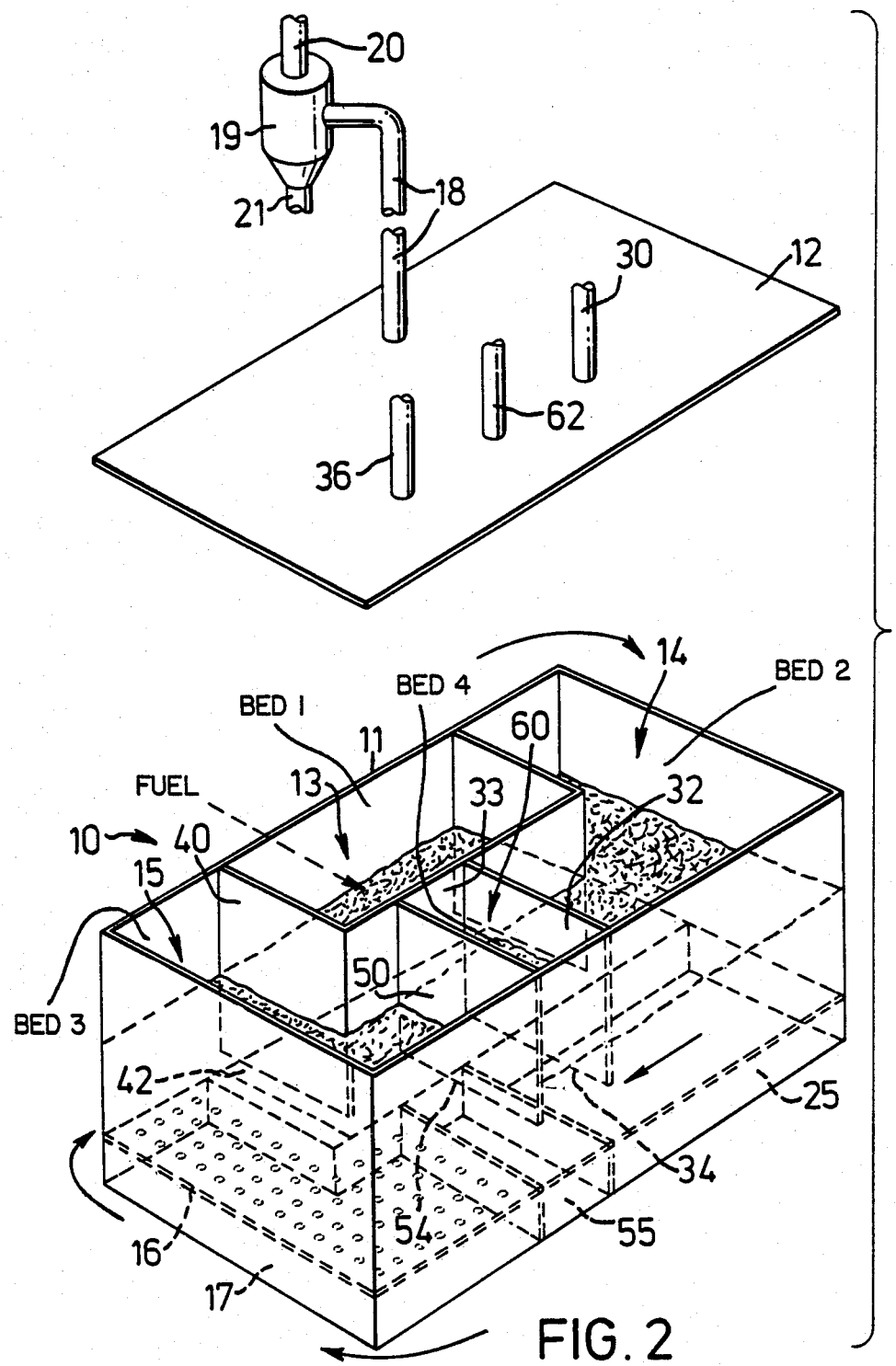
FIG. 2 shows the general arrangement of apparatus generally similar to that of FIG. 1 but with four compartments instead of three, and with certain other differences.

It will be appreciated that the continued operation of the apparatus of FIG. 1 with a sulfur-containing fuel will result in a continuous increase in the sulfur content of the circulating particles. In order to avoid an increase in sulfur content to levels which will reduce the sulfur-fixing ability of the first bed to undesirably low levels, there may be either (a) a continuous or incremental addition of fresh CaO-containing particles to the one or more beds and a corresponding removal or discharge of particles, preferably from the third bed, or (b) the apparatus may be adapted for the regeneration of CaO from CaS and/or $CaSO_4$. FIG. 2 shows apparatus according to the invention provided with a fourth bed between the second and third beds for the regeneration of CaS to CaO. It is to be understood that features of the apparatus of FIG. 1 (such as the heat exchange coil 27) may be incorporated in the apparatus of FIG. 2 and vice-versa without departing from the invention.

Reference is now made to FIG. 2 in which like features and structures have the same reference numerals as in FIG. 1. It will be seen that the vessel 10 comprises a fourth compartment 60 defined between the vertical wall 32 and an additional substantially vertical wall 50 parallel thereto and downstream thereof. The vertical walls 32 and 50 define with the distributor 16 respective underflow weirs 34, 54 in the form of slots which extend substantially across the width of the fourth compartment. The vertical walls 32, 50 extend beneath the distributor 16 to define a plenum 55 beneath the fourth compartment 60 from which fluidizing gas passes into the fourth bed within the fourth compartment 60.

Fuel is converted to low-sulfur combustible gas in the first bed 13 as herein described, and hot de-dusted combustible gas is recovered from the cyclone 19 via conduit 20. The solids recovered in dipleg 21 comprise relatively fine bed particles mixed with and/or coated with unburned fuel material. Hot particles comprising CaO and CaS pass from the bottom layer of the first bed in first compartment 13 to the bottom layer of the second bed in the second compartment 14 wherein the particles are fluidized by air or other gas containing a molecular oxygen supplied from the plenum beneath the distributor 16 so that the second bed temperature is about 50° to 150° C. hotter than the first bed temperature, preferably 970° to 1030° C. preferably about 1000° C. Some CaS (but not all) is oxidized to $CaSO_4$ with substantially no liberation of sulfur moiety into the gas passing through the second compartment 14. The suppression of the release of sulfur moiety is conveniently ensured by fluidizing the second bed with sufficient molecular oxygen that there is a small amount of oxygen (eg. up to 5 vol %, preferably 0.5 to 4 vol %, e.g. 1 to 3%, most preferably 1% to 2% $O_2$) in the gas leaving the top of the second bed, whereby the oxidatiion of CaS in the second bed is selective to $CaSO_4$.

Bed solids pass from the second bed to the fourth bed in the fourth compartment 60 via the underflow weir 34. The bed solids comprise CaS, $CaSO_4$ and CaO (inter alia) and are fluidized by a regeneration gas (e.g. air) containing molecular oxygen supplied from plenum 55, the oxygen rate being sufficiently low to ensure that substantially no oxygen is present in the gas leaving the fourth compartment 60 via its outlet conduit 62. Under these conditions, which are readily monitored using conventional well-known equipment, the temperature in the compartment 10 may be maintained at a value in the range of from 1050° to 1090° C., preferably about 1070° C., by regulating the oxygen rate in accordance with the fourth bed temperature, and some of the CaS is exothermically converted to CaO with the liberation of sulfur moieties into the gas within the fourth bed. The sulfur moieties may be $SO_2$ in a relatively high concentration (e.g. up to 14 vol % when operating at atmospheric pressure, although about 6 to 8 vol % is more usually attained).

If a reducing component, such as the fuel which is converted in the first compartment 13 or char or other fuel residue, is introduced into the fourth bed, e.g. as a fluidized layer at the top of, and in contact with, the fourth bed, the sulfur moiety will leave the fourth compartment as elemental sulfur. The method by which this in situ reduction of sulfur oxides to sulfur is effected is described in UK patent specification 1541434. In a preferred embodiment, at least some of the solids separated from the combustible gas in the cyclone 19 and recovered via dipleg 21 are diverted by a suitable diverting valve so as to pass to a conduit (not shown) which introduces the solids into the fourth bed, any remaining solids not so diverted being returned to the first bed and/or recovered for disposal. The fuel material in and associated with the recovered separated solids serves to reduce sulfur oxides to elemental sulfur. The hot gases and vapours leaving the fourth compartment 60 are passed through suitable de-dusting equipment (not shown) to remove entrained solids (and, it will be appreciated, that all the exiting gas streams may be de-dusted, if solids-free gas streams are required).

Bed particles, comprising particles containing CaO, $CaSO_4$ and unconverted CaS, pass via the port 54 from the bottom layer of the fourth bed into the bottom layer of the third bed in the third compartment 15 wherein they are fluidized by a gas containing molecular oxygen (e.g. air) which is supplied at a rate which is so regulated that the gas leaving the third bed contains molecular oxygen, the presence of this excess of oxygen suppressing the liberation of sulfur moieties into the gas leaving the bed. Under these conditions, the remaining reactive CaS is exothermically converted to $CaSO_4$ thereby maintaining the temperature of the fourth bed higher than the temperature of the first bed, e.g. by from 50° to 200° C., preferably 75° to 175° C., e.g. from 100° to 150° C., whereby the third bed temperature is preferably in the range of from 1050° to 1150° C., e.g. 1060° to 1080° C.

Bed particles comprising $CaSO_4$ and CaO pass from the bottom layer of the third bed (compartment 15) into the bottom layer of the first bed (compartment 13) via the slot-shaped underflow port weir 42 as described in relation to FIG. 1 whereby the sensible heat of the particles entering the first bed from the third bed maintains the first bed temperature at a fuel conversion temperature, and the entering particles contain at least sufficient reactive $CaSO_4$ for fuel conversion and an excess of reactive CaO to fix sulfur from the fuel as CaS in the first bed.

For continuous operation of the apparatus, the amount of sulfur moiety liberated in the fourth compartment 60 must match the amount of sulfur from the fuel which is fixed as CaS in the first bed (compartment 13). This matching may be effected in a number of ways— e.g. by monitoring the amount of sulfur moiety produced from the fourth compartment 60 and varying the rate of oxygen (e.g. as air) supply to the fourth bed from the plenum 55 in accordance therewith. Alternatively or in addition, the off-gases leaving the fourth compartment 60 may be monitored for molecular oxygen and the oxygen (e.g. air) supply rate reduced whenever molecular oxygen is detected in the off-gases. In yet a further method, the fourth bed temperature (and/or off-gas temperature) is monitored and the rate of oxygen (e.g. air) supply to the plenum 55 is regulated to maintain the fourth bed temperature within the range at which sulfur moieties are liberated into the off-gases.

Other methods for maintaining a substantially constant inventory of sulfur moiety in the solids circulating in the vessel 10 may be employed to regulate the liberation of sulfur moieties in the fourth compartment 60, and any combination of methods, including those specifically mentioned, may also be employed. It will be appreciated that the geometric arrangement of compartments and beds shown in FIG. 2 is one of several that may be used to produce similar or approximately equivalent results. For example, if the sulfur moieties liberated in the fourth compartment are to be discarded, e.g. to the atmosphere as, e.g. $SO_2$ preferably in an environmentally-acceptably diluted form (e.g. admixed with a large volume of innocuous waste gas), the fourth compartment 60 may be dispensed with by the elimination of one of its substantially vertical end walls 32 or 50.

It will be appreciated that the apparatus of the invention may comprise a vessel 10 which is compartmented in ways other than those shown—e.g. at least some of the compartmenting walls may be radial, and at least part of the peripheral wall may be arcuate in plan.

I claim:

1. A process using an apparatus comprising a unitary vessel comprising a substantially vertical peripheral wall and a roof, the interior of the vessel being divided into at least three horizontally-successive compartments by substantially vertical internal walls extending downwardly from the roof, each compartment having a respective distributor at its base which distributes a respective fluidizing gas from a respective space beneath the distributor into the bottom of each compartment and into a bed of solid particles supported on the top of the respective distributor thereby maintaining said particles in a respective dense phase fluidized bed, each dense phase fluidized bed having a substantially distinct top surface at a respective top level within the respective compartment, the roof over each compartment having a respective outlet for the exit of gas from the compartment, each compartment having an internal wall defining an underflow weir below the said top level and thereby providing communication between a lower region of the downstream end of one compartment on one side of the internal wall and a lower region of the upstream end of an adjacent compartment on the other side of the wall, and in which process, particles circulate from the lower region of the downstream end of the fluidized bed in one compartment to the lower region of the upstream end of the adjacent fluidized bed in the adjacent compartment, and wherein said process comprises:
   a. passing a gas substantially free of diluents and which contains an oxygen-transfer mediator into a first compartment containing a first dense phase fluidized bed containing particles comprising chemically reactive $CaSO_4$ at a temperature in the range of from 850° to 1150° C.;
   b. passing an oxygen-containing gas into the second compartment containing a second dense phase fluidized bed of particles of chemically reactive CaS at such a rate as to convert some, but not all, of the CaS in the second dense phase fluidized bed to $CaSO_4$ with substantially no liberation of the sulfur moiety therefrom and such that the gas leaving the second compartment via the respective outlet in the roof contains substantially no sulfur moiety and no more than 5 vol% of molecular oxygen;
   c. passing an oxygen-containing gas into the third compartment containing a third dense phase fluidized bed of particles comprising chemically reactive CaS at a temperature higher than the temperature in the first bed at such a rate that substantially all chemically-reactive CaS is exothermically converted to $CaSO_4$ with substantially no liberation of sulfur moiety and the gas leaving the third compartment via the respective outlet in the roof is substantially free of sulfur moiety and contains no more than 5 vol% of molecular oxygen, and wherein particles circulate through all the compartments of the apparatus in one sense from the bottom region of one bed in one compartment to the bottom region of the adjacent bed in the adjacent compartment so that particles circulate through all the beds in succession, and wherein a hydrocarbon and/or carbonaceous fuel is passed into the first compartment in contact with the particles of the first dense phase bed to convert the fuel to combustible gas and to reduce chemically reactive $CaSO_4$ to CaS with substantially no liberation of sulfur moiety as a result of the presence of the oxygen-transfer mediator.

2. A process as in claim 1 in which at least some of the oxygen-containing gas passing into the third fluidized bed passes in indirect heat exchange with the second fluidized bed at a rate which maintains the second fluidized bed at a temperature no higher than 850° C.

3. A process as in claim 2 in which the oxygen-containing gas passing into the second fluidized bed comprises air and the gas recovered from the second compartment comprises substantially oxygen-free air.

4. A process as in claim 2, in which the third bed is maintained at a temperature in the range of from 840° to 1060° C.

5. A process as in claim 1 in which the apparatus comprises a fourth compartment defined between a vertical internal wall of the second compartment and a vertical internal wall of the third compartment, the fourth compartment having a distributor at its base supporting a fourth dense phase fluidized bed, the vertical internal walls which define the fourth compartment each having an undeflow weir whereby particles circulate into a lower region of the upstream end of the fourth compartment from a lower region of the downstream end of the second compartment and particles circulate into a lower region of the upstream end of the third compartment from a lower region of the downstream region of the fourth compartment, the process comprising passing oxygen-containing gas into the fourth dense phase fluidized bed containing particles comprising chemically reactive CaS and $CaSO_4$ at a temperature in the range of from 1050° to 1090° C. and at a rate which provides insufficient oxygen for the conversion of all CaS to $CaSO_4$ whereby some CaS is converted to CaO with the liberation of sulfur moiety from the bed.

6. A process as in claim 5 in which the fuel passing into the first compartment is a sulfur-containing fuel and the first dense-phase fluidized bed contains particles comprising chemically reactive CaO which captures or fixes sulfur from the fuel to form CaS, and the rate of liberation of sulfur moiety in the fourth bed is approximately equal to the rate at which sulfur is captured or fixed from the sulfur-containing fuel in the first bed.

7. A process as in claim 1 in which the fuel passing into the first compartment is a sulfur-containing fuel, and the first dense-phase fluidized bed contains particles comprising chemically reactive CaO which captures or fixes sulfur from the fuel to form CaS.

8. A process as in claim 2 in which the temperature of the second fluidized bed is maintained within the range of from 740° C. to 850° C.

* * * * *